(12) United States Patent
Pope et al.

(10) Patent No.: US 6,835,130 B2
(45) Date of Patent: Dec. 28, 2004

(54) GRAIN COMPARTMENT CLEANOUT ARRANGEMENT

(75) Inventors: Glenn E. Pope, Viola, IL (US); Mark DePoorter, East Moline, IL (US); Chad Dow, East Moline, IL (US)

(73) Assignee: Deere & Co., Moline, IL (US)

( * ) Notice: Subject to any disclaimer, the term of this patent is extended or adjusted under 35 U.S.C. 154(b) by 0 days.

(21) Appl. No.: 10/309,975

(22) Filed: Dec. 4, 2002

(65) Prior Publication Data

US 2004/0110549 A1 Jun. 10, 2004

(51) Int. Cl.$^7$ ................................................ A01F 12/60
(52) U.S. Cl. ...................................... 460/103; 460/119
(58) Field of Search ........................... 460/23, 103, 114, 460/119, 149, 150; 198/493, 494, 495

(56) References Cited

U.S. PATENT DOCUMENTS

| | | | |
|---|---|---|---|
| 3,664,525 A | | 5/1972 | Herbsthofer |
| 3,872,982 A | | 3/1975 | Rowland-Hill |
| 4,397,319 A | | 8/1983 | Schuhmacher |
| 4,400,131 A | | 8/1983 | Blake |
| 4,455,814 A | * | 6/1984 | Kienholz ..................... 56/126 |
| 4,529,085 A | * | 7/1985 | Johnson ..................... 198/532 |
| 4,594,840 A | | 6/1986 | D'Almeida et al. |
| 4,863,415 A | | 9/1989 | Carnewal et al. |
| 4,967,863 A | | 11/1990 | Teijido et al. |
| 5,088,960 A | | 2/1992 | Stickler et al. |
| 5,305,493 A | | 4/1994 | Prenn |
| 5,380,247 A | | 1/1995 | Underwood |
| 5,507,841 A | | 4/1996 | Heckman et al. |
| 5,546,630 A | | 8/1996 | Long |
| 5,624,315 A | | 4/1997 | Jonckheere |
| 6,036,598 A | | 3/2000 | Harden et al. |
| 6,058,690 A | | 5/2000 | Rutt et al. |
| 6,089,831 A | | 7/2000 | Bruchmann et al. |
| 6,102,795 A | * | 8/2000 | Behrens ..................... 460/119 |
| 6,285,198 B1 | | 9/2001 | Nelson et al. |
| 6,290,361 B1 | | 9/2001 | Berzin |
| 6,367,234 B1 | | 4/2002 | Hurlburt |
| 6,508,705 B1 | * | 1/2003 | Van Overschelde .......... 460/23 |

FOREIGN PATENT DOCUMENTS

| | | | |
|---|---|---|---|
| JP | 05146216 A | * | 6/1993 |
| JP | 2001028938 A | * | 2/2001 |

OTHER PUBLICATIONS

Deere & Co., 9650 STS and 9750 STS Combines, 2000, 4 pages.*
Drawing of Prior Art Auger Casting and Drain Opening Closure Plate Arrangements, 2 sheets (Admitted Prior Art).

* cited by examiner

Primary Examiner—Robert E. Pezzuto
Assistant Examiner—Nathan Mammen
(74) Attorney, Agent, or Firm—The Law Office of Randall T. Erickson, PC.

(57) ABSTRACT

A cleanout configuration is provided for a grain compartment on a harvesting apparatus. The grain compartment has walls that form a trough, and a vertically arranged auger that is supported on an auger casting located in a sump at a bottom of the trough. Wall portions, in the form of a unitary casting with the auger casting are adjacent to the auger casting and comprise cleanout openings covered by removable covers. The openings are in a grate pattern. The unitary casting can be a bridge member, which supports all, or a substantial amount of the weight of the unitary casting and the auger.

24 Claims, 8 Drawing Sheets

GRAIN COMPARTMENT CLEANOUT ARRANGEMENT

TECHNICAL FIELD OF THE INVENTION

The invention relates to harvesting apparatus, such as combines. Particularly, the invention relates to a cleanout arrangement for a grain compartment of a harvesting apparatus.

BACKGROUND OF THE INVENTION

Horticultural crops may be classified as edible crops, inedible crops, genetically modified organisms (GMO's), non-GMO, organic, pesticide-free, or in accordance with other crop attributes. Inedible crops may include crops such as fiber, cotton or rubber, for example. Genetically modified crops may include vegetables that are genetically manipulated to hold their shelf life longer than traditionally cultivated vegetables. Organic crops are harvested from plants that are grown without exposure to certain pesticides, herbicides or other chemicals.

Crops may be grown to specific crop attributes or specifications. Crop attributes may be based on the genetic composition of a crop, the growing practices for a crop, or both. For example, a certain variety of corn may be grown that has greater oil content than other varieties because of genetic or environmental factors. Similarly, a certain variety of soybeans may be grown that has a different protein content or other crop attribute that is desirable. A processor, a pharmaceutical company, a manufacturer or another concern may desire to purchase agricultural products with specific crop attributes from a grower or another supplier. The grower or supplier may wish to charge a premium for crops with specific crop attributes compared to a commodity-type crop. The purchaser of the agricultural product may desire sufficient assurance that the agricultural product that is being purchased actually possesses the crop attributes that are sought.

Thus, a need exists to accurately identify crops with specific crop attributes throughout the growing and distribution of crops with specific crop attributes and any products derived therefrom. Further, a purchaser of an agricultural product or a crop may desire or demand the ability to trace the identity of the crop with specific crop attributes to verify the presence of the crop attributes, or the absence of undesired attributes, as a condition for a commercial transaction. Thus, there is a need to segregate crops during harvesting such that no mixing of crops or crop residue with different attributes occurs.

After unloading a grain compartment of a combine, there may be grain and residue left in the lower portions of the grain compartment that cannot be easily mechanically removed. The present inventors have recognized that in order to ensure segregation of crops with different attributes, it would be desirable if the combine was able to be thoroughly cleaned of grain and residue between harvesting of crops of different attributes.

Presently, to thoroughly clean grain compartments, the operator must sometimes crawl into a very small space that is not accessible from the ground and vacuum out or sweep out the grain and residue. The present inventors have recognized that it would be desirable if the grain compartment of a harvesting apparatus could be configured to be thoroughly cleaned, while reducing or eliminating the time that an operator spends in lower portions of the grain compartment vacuuming out or sweeping out grain or residue.

SUMMARY OF THE INVENTION

The invention provides a cleanout configuration for a grain compartment on a harvesting apparatus. The grain compartment has walls that form a trough, and a vertically arranged auger that is supported on an auger casting carried by a bottom of the trough. According to the invention, at least one wall portion adjacent to the auger casting comprises cleanout openings covered by a removable cover. Preferably, the one wall portion comprises a casting having openings in a grate pattern.

According to one exemplary embodiment, the grain compartment comprises two wall portions, each wall portion adjacent to the auger casting. Each wall portion forms a portion of a sump or charge housing that is attached to the trough walls. Each of the wall portions comprises cleanout openings covered by a removable cover. Each of the wall portions comprises a casting, and each of the wall portions comprises a grate pattern of cleanout openings. The wall portions can be fastened to the trough walls at outside ends.

As a further aspect of the invention, one or both of the wall portions comprises a unitary casting with the auger casting. The unitary casting can function as a beam or bridge member, which supports all, or a substantial amount of the weight of the unitary casting and the auger.

As a still further aspect of the invention, a single piece casting is provided that incorporates the auger casting and both wall portions, as the front and rear angled sheets of the sump. The casting can serve as a structural member to eliminate the need for additional supports for the vertical auger. The casting can replace the heretofore known auger casting and front and rear sheet metal portions of the sump with one simple casting component, allowing more efficient assembly and the reduction in number of separately assembled parts.

The casting of the exemplary embodiment of the invention includes cleanout openings that allow for better access into the lower portions of the grain compartment and improved emptying of the grain compartment for thorough cleaning. The casting of the exemplary embodiment of the invention advantageously has a depth profile such that grain will easily flow through the casting cleanout openings during cleaning.

Numerous other advantages and features of the present invention will be become readily apparent from the following detailed description of the invention and the embodiments thereof, from the claims and from the accompanying drawings.

DETAILED DESCRIPTION OF THE PREFERRED EMBODIMENTS

Figure 1:
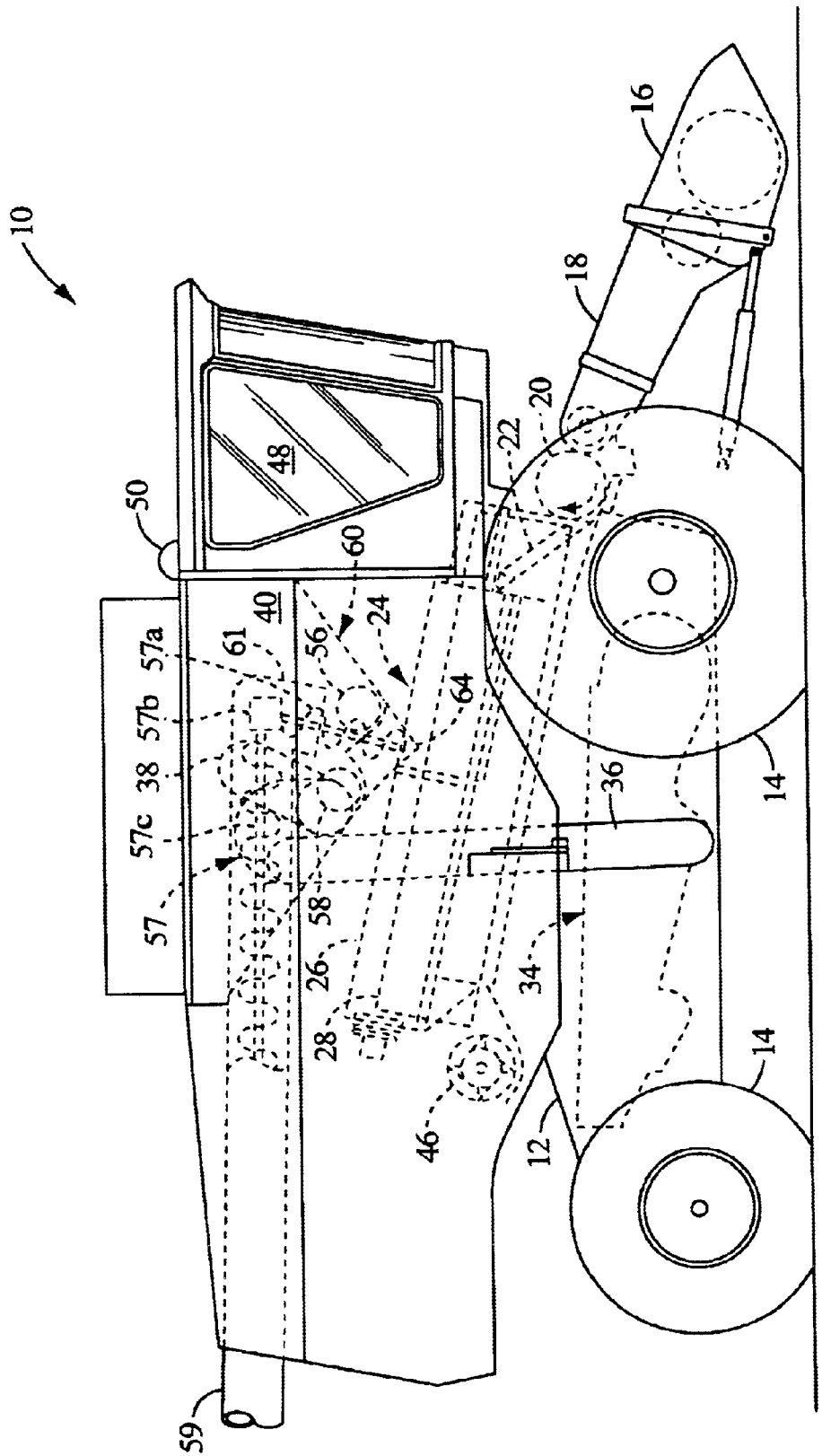
FIG. 1 is a schematical side view of a harvesting apparatus that incorporates the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 2:
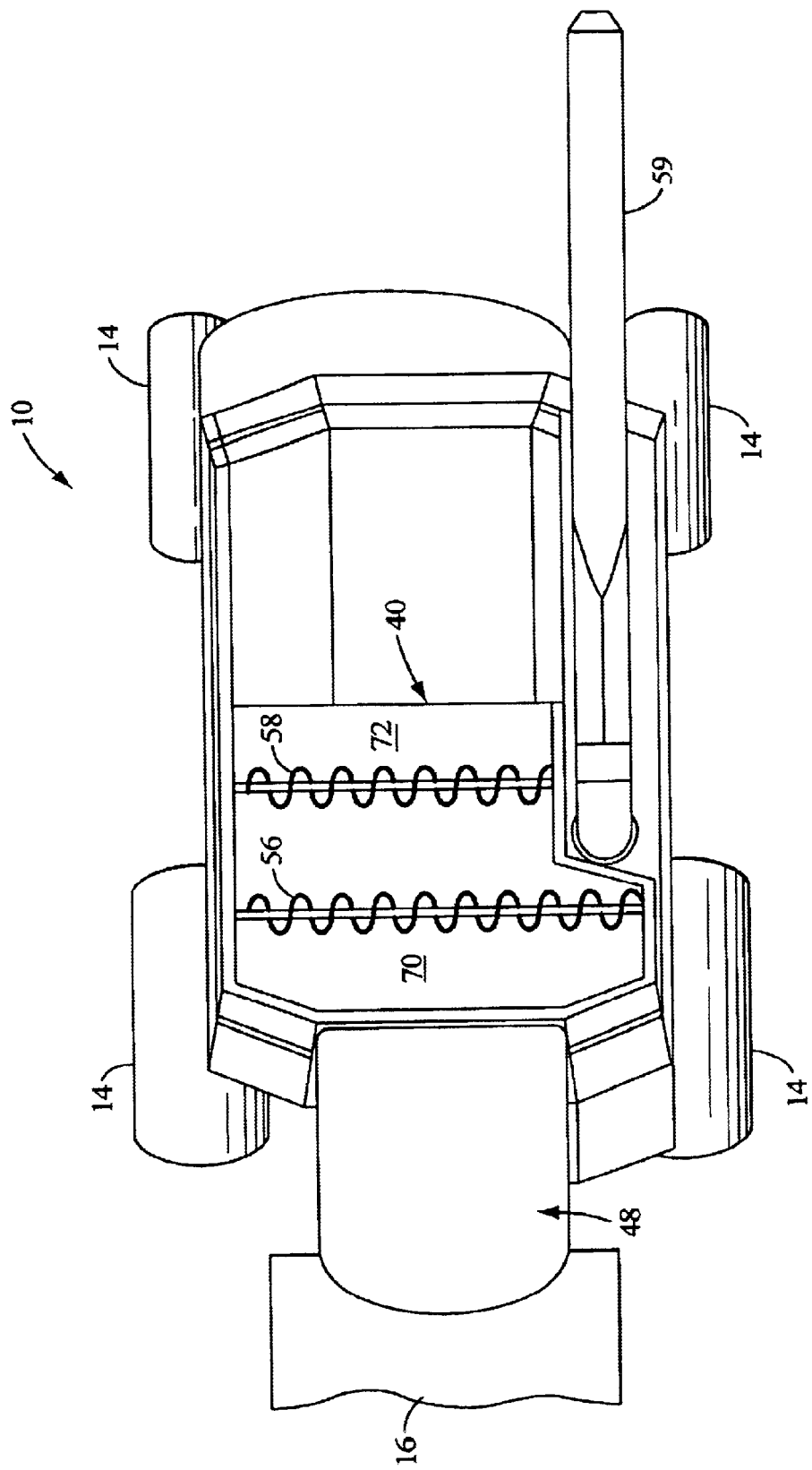
FIG. 2 is a schematical plan view of the harvesting apparatus of FIG. 1.

FIGS. 1 and 2 illustrate a harvesting apparatus, such as an agricultural combine 10. Such combines are of a type described for example in U.S. Pat. No. 6,285,198, herein incorporated by reference, and are also of the type commercially available as a JOHN DEERE 9650 STS or 9750 STS combine. Although the invention is being described as being incorporated into a rotary combine, it may also be used on other combines, such as conventional straw walker machines.

FIG. 1 shows an agricultural combine 10, also known as a combine thresher. The combine 10 comprises a supporting structure 12 having ground engaging means 14 extending from the supporting structure. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24. The axial crop processing unit is located between, and supported by the sidesheets of the combine.

The axial crop processing unit 24 comprises an axial rotor housing 26 and an axial rotor 28 located in the housing. The harvested crop enters the housing through the inlet transition section 22. The rotor is provided with an infeed portion, a threshing portion and a separating portion. The rotor housing has a corresponding infeed section, a threshing section and a separating section.

Both crop processing portions, the threshing portion and the separating portion, are provided with crop engaging assemblies. The threshing section of the rotor housing is provided with a concave and the separating section is provided with a grate. Grain and chaff released from the crop mat falls through the concave and the grate. The concave and grate prevent the passage of crop material larger than grain or chaff from entering the cleaning system 34.

As illustrated in FIG. 1, grain and chaff falling through the concave and grate is directed to cleaning system 34 which removes the chaff from the grain. The clean grain is then directed by a clean grain elevator 36 to a fountain auger 38. The fountain auger 38 directs the grain into a grain tank or grain compartment 40. The clean grain elevator 36 and the fountain auger 38 comprise a means for moving the clean grain from the grain floor of the combine to a storage bin formed by grain tank 40. The grain is removed from the grain tank 40 by unloading auger 57. As the straw reaches the end of the crop processing unit it is expelled through an outlet to a beater 46. The beater 46 propels the straw out the rear of the combine. The operation of the combine is controlled from the operator's cab 48.

When the clean grain compartment is to be unloaded, transverse unloading augers 56 and 58 direct the grain to the side of the compartment where it comes into contact with an unloading auger 57 which directs the clean grain through a vertical unloading tube 61 and a horizontal unloading tube 59. The auger 57 includes a vertical section 57a, at least partially within the tube 61, a right angle gear 57b, and a horizontal section 57c within the tube 59. During an unloading operation, tube 59 would normally be extended outwardly from the side of the combine so that clean grain can be more readily directed into a wagon or truck.

The grain compartment 40 includes a trough 60, which includes a major trough region 70 and a minor trough region 72 that house the horizontal augers 56, 58, respectively. The trough 60 is open to a charge housing or sump 64. The vertical auger section 57a extends through the vertical tube 61 and into the sump 64. The grain which is fed through the trough horizontally by the horizontal augers 56, 58 is delivered into the sump 64 and is removed by the vertical auger section 57a through the tube 61, and by the horizontal auger section 57c through the tube 59.

Figure 3:
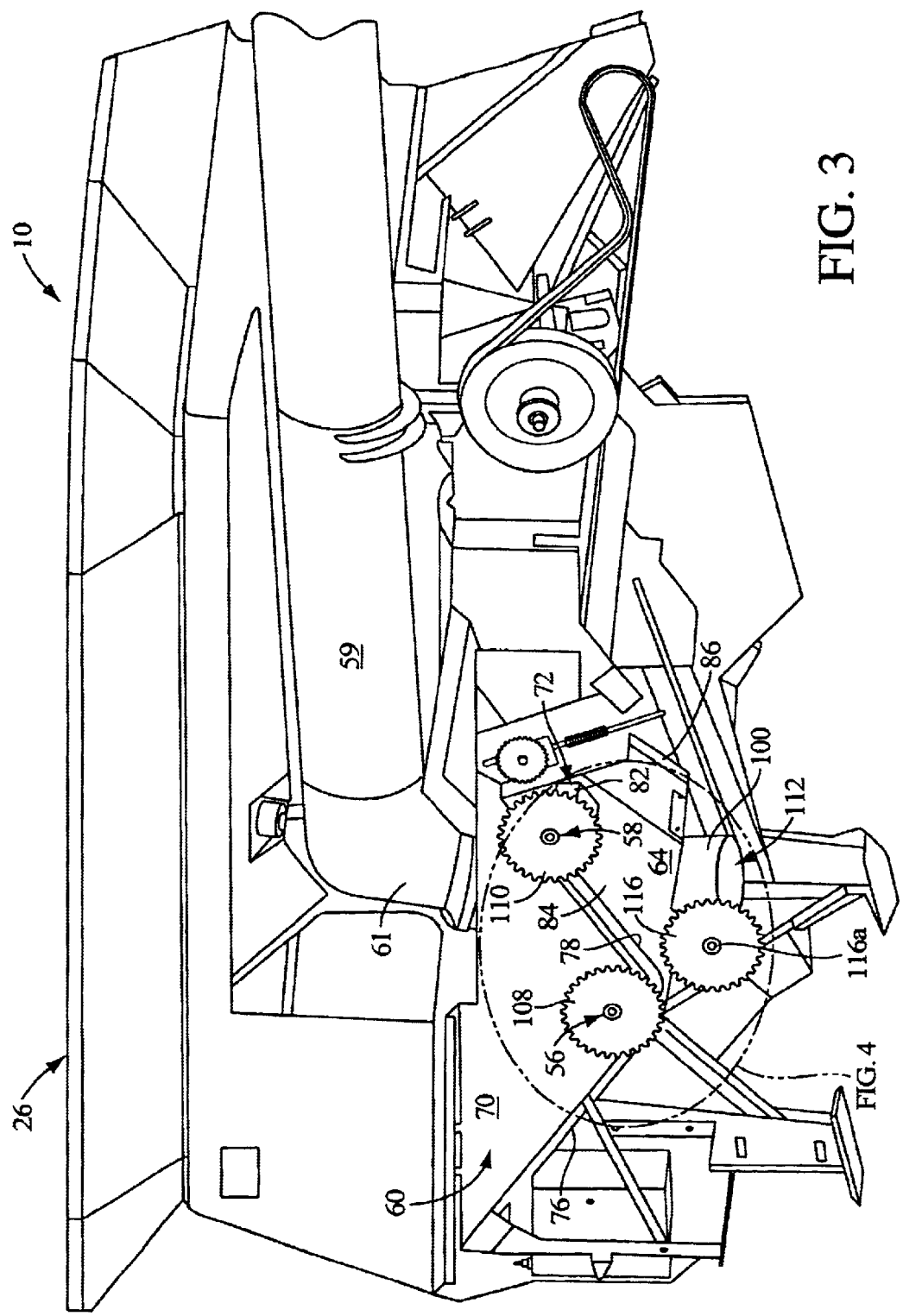
FIG. 3 is an enlarged, fragmentary perspective view of a grain compartment area of the harvesting apparatus of FIG. 1.

As illustrated in FIG. 3, the major trough region 70 includes a forward inclined wall 76 and a rearward inclined wall 78. The minor trough region 72 includes a rearward inclined wall 82 that curves into the rearward inclined wall 78 of the major trough region 70. The sump 64 includes sidewalls 84, 86 that extend substantially parallel and vertical and are fastened substantially continuously to the inclined walls 78, 82. The sidewall 86 is not entirely visible in the Figures. The sidewall 86 has substantially the same shape as the sidewall 84.

Figure 4:
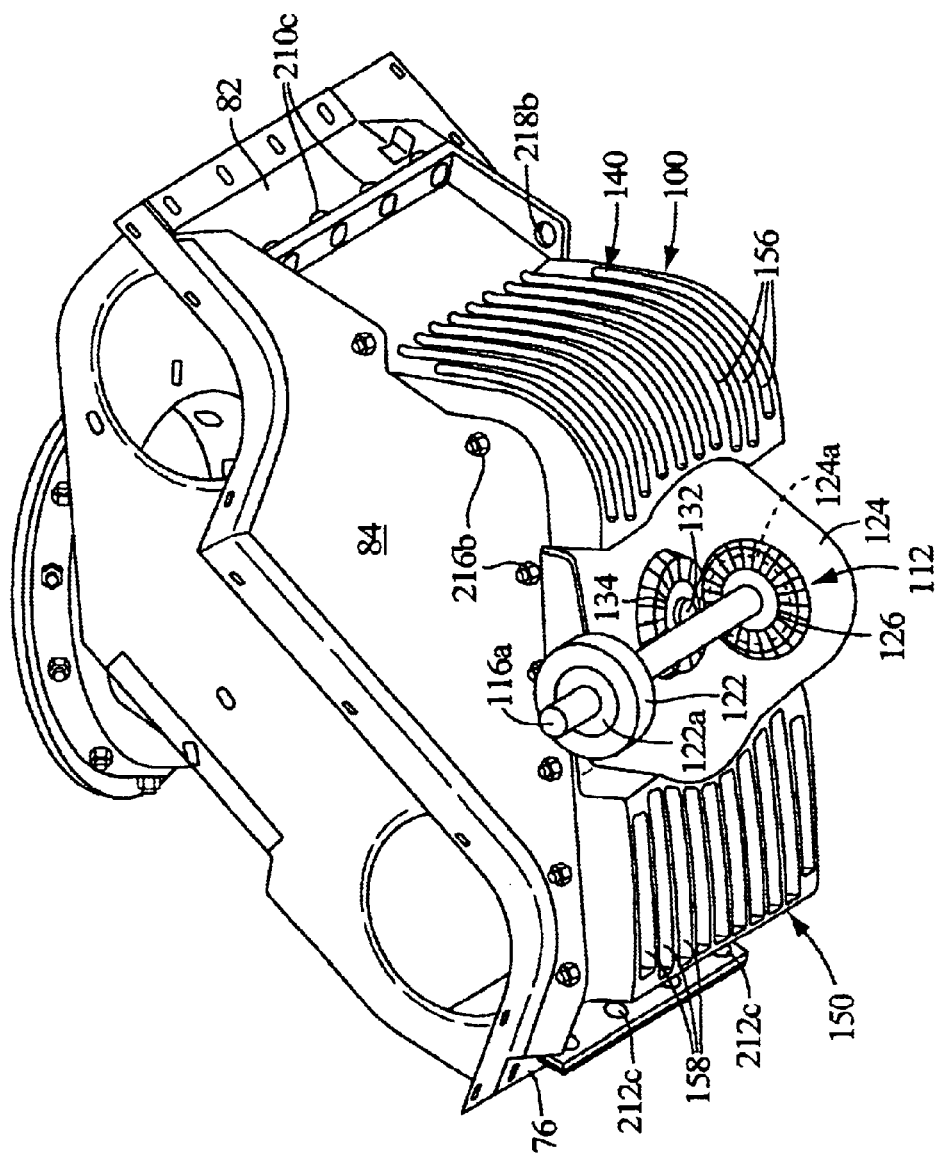
FIG. 4 is an enlarged, fragmentary bottom perspective view of the grain compartment area shown in FIG. 3.

As illustrated in FIG. 4, a casting 100 is fastened to the walls 76, 82, 84, 86. The sidewalls 84, 86 and the casting 100 form a substantially enclosed sump 64 mounted to the trough 60, except for drain and cleanout openings described below. When cover plates are installed on the casting 100, the sump 64 has a substantially sealed integrity with the trough regions 70, 72.

The augers 56, 58 are driven by sprockets 108, 110 (FIG. 3). The auger 57 is driven by a right angle gear drive 112 that is driven by a sprocket 116 (FIG. 3) via an input shaft 116a. A chain drive arrangement for turning the sprockets 108, 110, 116 is described in more detail in U.S. Pat. No. 4,967,863, or as described in U.S. application Ser. No. 10/309,977, filed on the same day as the present application, both herein incorporated by reference.

Figure 5:
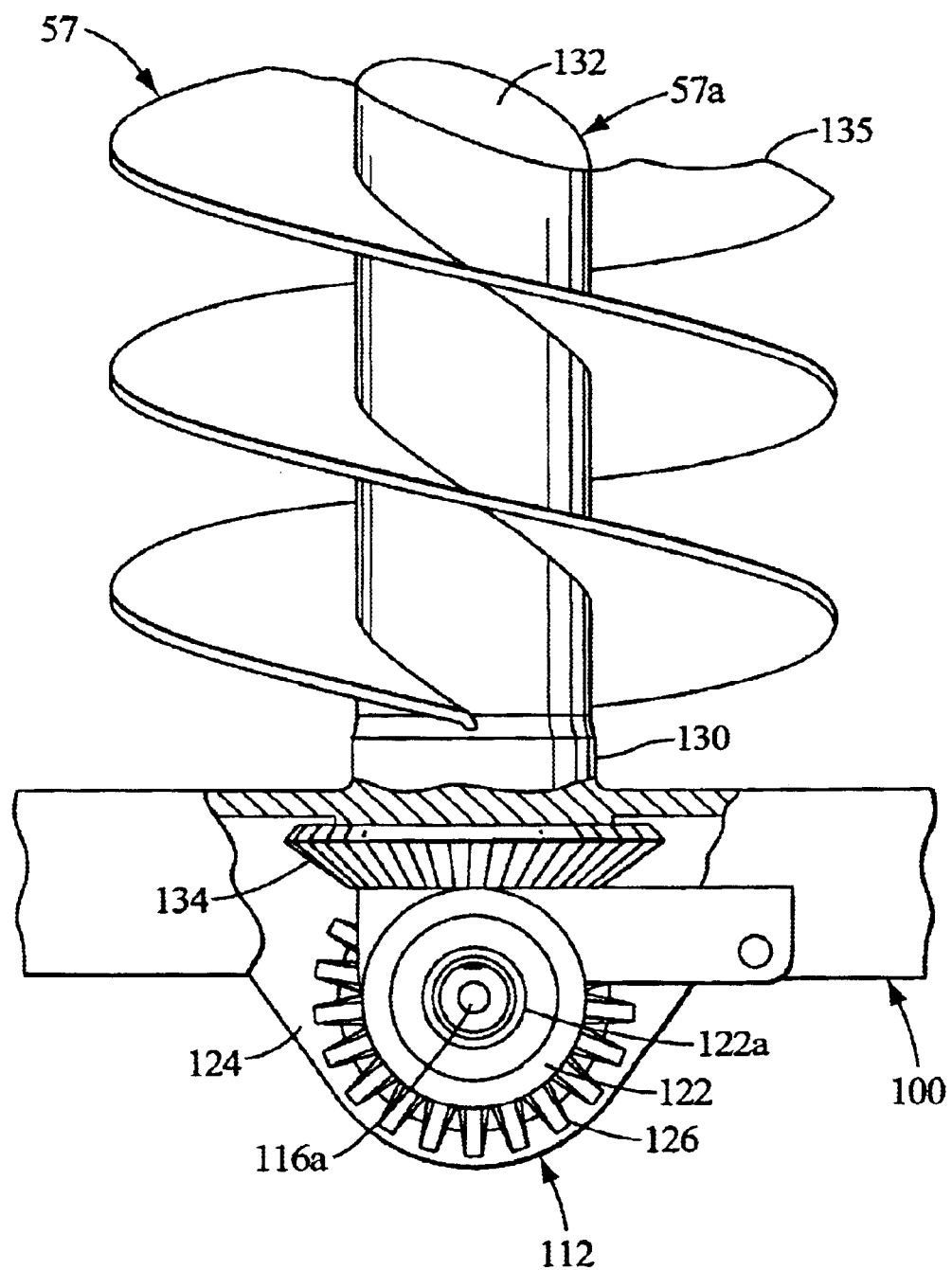
FIG. 5 is an enlarged, fragmentary side view of a sump portion of the grain compartment area with sidewalls removed to view internal components.

The casting 100 comprises journals 122, 124 for rotatably holding a horizontal axis gear assembly 126 for the right angle gear drive 112. Bearings 122a, 124a are used within the journals 122, 124. The casting 100 also includes a journal 130 for supporting and rotationally holding a vertical axle 132 (FIG. 5) of the auger 57. A rotation and thrust bearing arrangement (not shown) is used within the journal 130. A vertical axis gear 134 is fixed to the axle 132 and enmesh with the gear 126. Turning of the gear 134 by the gear 126 turns the axle 132 and flighting 135 of the auger 57.

A rear casting portion 140 is fastened to the wall 82, and the side walls 84, 86. A front casting portion 150 is fastened to the wall 76 and the side walls 84, 86.

The casting portions 140, 150 include respective openings 156, 158 for draining and cleaning the sump 64. Preferably, the casting portions 140, 150 are formed with substantially open faces with a grate pattern of openings formed by parallel, elongated openings 156, 158. The casting 100 maintains sufficient strength while having the advantages of reduced weight and substantially open, flow-through design. A bridge or beam formed by the casting 100 is sufficiently rigid to support the weight of the casting 100 and the auger 57. Therefore, other structural supports normally provided to reinforce sheet metal panels for supporting the auger 57, could be reduced in mass or eliminated.

During normal operation of the combine 10, the openings 156, 158 are closed by underlying cover plates (not shown)

fastened to the casting 100. The cover plates are removed for cleaning the grain compartment of the combine.

Figure 6:
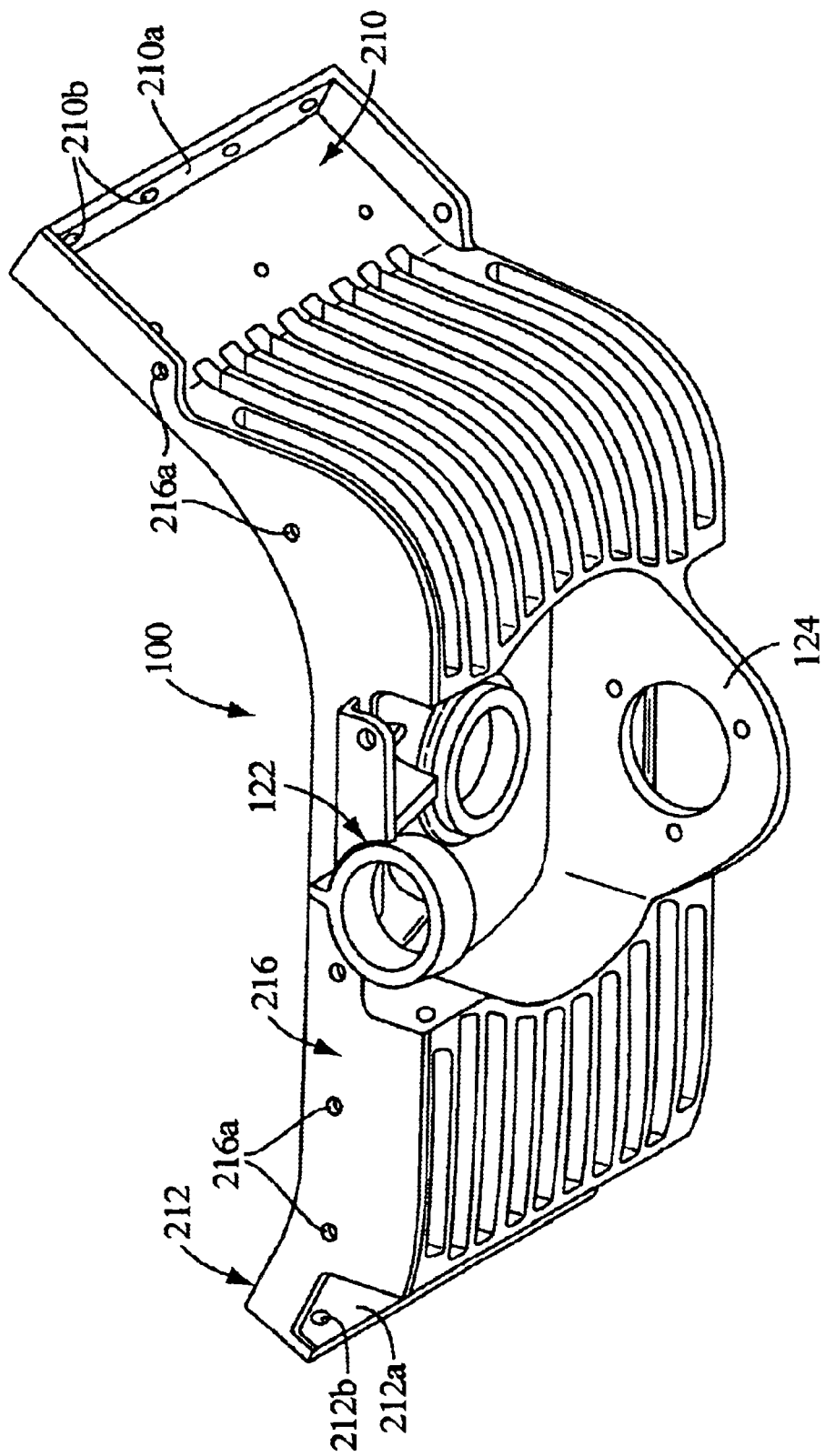
FIG. 6 is a bottom perspective view of the sump casting shown in FIGS. 4 and 5.
Figure 7:
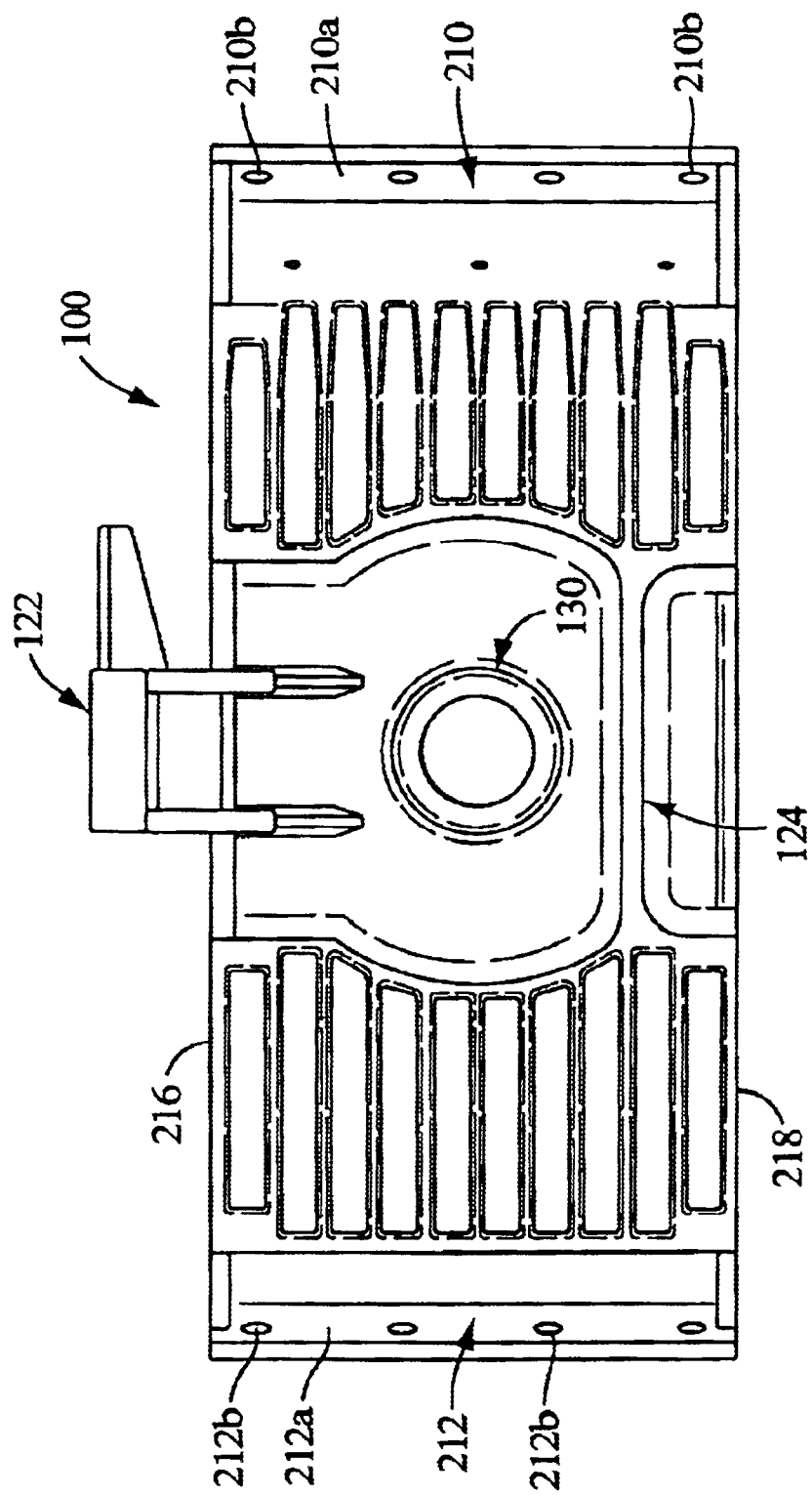
FIG. 7 is a bottom view of the sump casting of FIG. 6.
Figure 8:
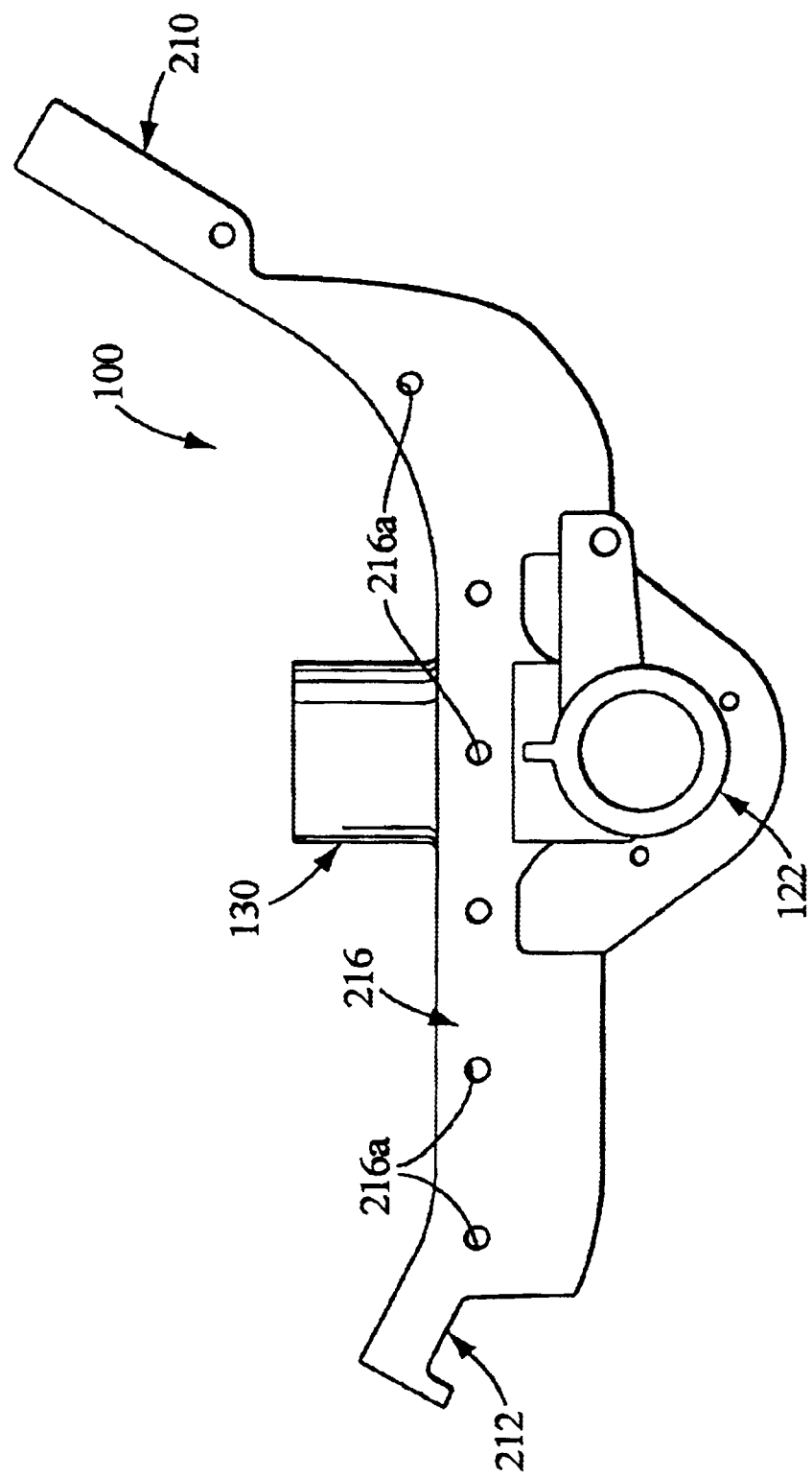
FIG. 8 is a side view of the sump casting of FIG. 6.

FIGS. 6–8 illustrate that the casting 100 includes end plate portions 210, 212 that include end flanges 210a, 212a having holes 210b, 212b for receiving fasteners 210c, 212c (FIG. 4) for fastening the casting 100 to the trough walls 76, 82. The casting 100 also includes sidewalls 216, 218 having side holes 216a, 218a for receiving fasteners 216b, 218b (FIG. 4) to fasten the sump sidewalls 84, 86 to the casting 100. The holes 210b, 212b, 216a, 218a can be threaded or through-drilled. Bolts with corresponding nuts can be used for through-drilled holes. The casting sidewall 218 shown in FIG. 7 is substantially similar to the casting sidewall 216 in shape and hole pattern.

Cleaning of the grain compartment is undertaken by removing the cover plates that seal the openings 156, 158. Cleaning is accomplished by using high velocity compressed air discharged from either nozzles located within the grain tank or from a wand to move grain and residue toward and into the sump 64 from bottom areas of the trough 60. From the sump 64 the grain and residue can exit the grain compartment by falling through the openings 156, 158. Alternatively, as enhancements, the grain and residue can be moved and removed according to systems and methods described in U.S. application Ser. No. 10/309,977, filed on the same day as the present application, and U.S. application Ser. No. 10/309,979, filed on the same day as the present application, both herein incorporated by reference.

The casting 100 described above is preferably composed of cast iron, although other materials of construction are encompassed by the invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. In a harvesting apparatus having a grain compartment, said grain compartment having walls that form a trough, and a sump open to, and on a bottom of said trough, at least one horizontal auger located along bottom of said trough and having an auger discharge end over said sump, and a vertically arranged auger that is supported on an auger casting located at a bottom of the sump, said vertical auger adjacent to said auger discharge end, the improvement comprising:

at least one wall portion of said sump that is adjacent said auger casting comprises cleanout openings beneath said auger discharge end, said cleanout openings covered by a removable cover.

2. The improvement according to claim 1 wherein said one wall portion comprises openings in a grate pattern.

3. The improvement according to claim 1, wherein said wall portion supports said auger casting and is substantially rigid and self-supporting along a horizontal span of said sump.

4. The improvement according to claim 1, wherein said one wall portion comprises a casting and wherein said casting includes openings in a grate pattern.

5. The arrangement according to claim 1, wherein said one wall portion comprises a casting and wherein said casting includes two wall portions, each wall portion adjacent to one side of said auger casting, each said wall portion comprising cleanout openings covered by a removable cover.

6. The improvement according to claim 5, wherein said wall portions and said auger casting comprise a unitary casting.

7. The improvement according to claim 1, wherein said one wall portion comprises a casting.

8. The improvement according to claim 1, wherein said one wall portion comprises a unitary casting with said auger casting.

9. The improvement according to claim 1, comprising two wall portions, each wall portion adjacent to one side of said auger casting, each said wall portion comprising cleanout openings covered by a removable cover.

10. The improvement according to claim 1, wherein said at least one horizontal auger comprises two horizontal augers, each with an auger discharge end, and wherein said at least one wall portion comprises two wall portions, each wall portion comprising cleanout openings beneath a respective one of said discharge ends, said cleanout openings covered by removable covers.

11. In a harvesting apparatus having a grain compartment, said grain compartment having walls that form a trough, and a vertically arranged auger that is supported on an auger casting located at a bottom of the grain compartment, the improvement comprising:

two wall portions, each wall portion adjacent to one side of said auger casting, each said wall portion comprising cleanout openings covered by a removable cover;

wherein said grain compartment comprises a sump, said sump fastened to said trough and open to said trough to receive grain from said trough, wherein at least one wall portion comprises a wall of said sump and said auger casting is carried by said sump.

12. The improvement according to claim 11, wherein said wall portions and said auger casting form walls of said sump.

13. The improvement according to claim 12, wherein said wall portions and said auger casting comprise a unitary casting.

14. In a harvesting apparatus having a grain compartment, said grain compartment having walls that form a trough, and a vertically arranged auger that is supported on an auger casting located at a bottom of the grain compartment, the improvement comprising:

at least one wall portion of said grain compartment that is adjacent said auger casting comprises cleanout openings covered by a removable cover;

wherein said grain compartment comprises a sump fastened to a bottom portion of said walls, wherein said auger casting is located at a bottom of said sump, and said at least one wall portion comprises two wall portions that form front and rear walls of said sump, each wall portion adjacent said auger casting, said wall portions being rigid members that are fixed at one end to rigid supports of said grain compartment at opposite ends of said grain compartment, and fixed to said auger casting, said wall portions and said auger casting forming a bridge to support a substantial amount of the weight of said auger casting.

15. The improvement according to claim 14, wherein each of said wall portions comprises a grate pattern of openings.

16. A cleanout arrangement for a grain compartment of a harvesting apparatus, the grain compartment having a trough and a sump open to and on a bottom of said trough, and a vertical auger extending down into said sump, comprising:

a wall portion of said sump, said wall portion having openings in a grate pattern, said openings arranged to empty said grain compartment of grain and residue during cleaning of said grain compartment, said openings comprising parallel openings extending longitudinally on both sides of said vertical auger.

17. A cleanout arrangement for a grain compartment of a harvesting apparatus, comprising:
   a wall portion located on a bottom wall of said grain compartment, said wall portion having openings in a grate pattern, said openings arranged to empty said grain compartment of grain and residue during cleaning of said grain compartment;
   wherein said grain compartment comprises a horizontal auger arranged along a grain-supporting surface of said grain compartment, said horizontal auger rotated to transport grain to a downstream end of said horizontal auger, and wherein said openings of said wall portion are is located beneath said downstream end.

18. The arrangement according to claim 17, wherein said grain compartment comprises a vertical auger adjacent said downstream end, said vertical auger supported on said wall portion.

19. A cleanout arrangement for a grain compartment of a harvesting apparatus, the grain compartment having a trough and a sump open to and on a bottom of said trough, and a vertical auger extending down into said sump, comprising:
   a wall portion of said sump, said wall portion having openings in a grate pattern, said openings arranged to empty said compartment of grain and residue during cleaning of said grain compartment;
   comprising a horizontal auger located within said trough; said horizontal auger configured to be rotated to transport grain along said trough to a downstream end of said horizontal auger, said downstream end located above said sump, wherein said wall portion comprises a casting, said casting supporting said vertical auger.

20. The arrangement according to claim 19, wherein said casting extends on opposite sides of said vertical auger and has openings on opposite sides of said vertical auger.

21. The arrangement according to claim 19, wherein said casting includes front and rear regions on opposite sides of a center region, said center region supporting said vertical auger, both said front and rear regions having openings in a grate pattern.

22. In a harvesting apparatus having a grain compartment, said grain compartment having a sump for collecting grain, a vertical auger having an inlet end in said sump, a first horizontal auger having a first discharge end over said sump, and a second horizontal auger having a second discharge end over said sump, the improvement comprising:
   a first wall portion having a plurality of first openings for emptying the sump, said plurality of first openings located below said first discharge end;
   a second wall portion having a plurality of second openings for emptying the sump, said plurality of second openings located below said second discharge end, said first and second openings closed by removable covers.

23. The improvement according to claim 22, wherein said second openings are open both vertically and horizontally.

24. The improvement according to claim 23, wherein said first openings are on one side of said inlet end of said vertical auger and said second openings are on an opposite side of said inlet end of said vertical auger.

* * * * *

UNITED STATES PATENT AND TRADEMARK OFFICE
CERTIFICATE OF CORRECTION

PATENT NO. : 6,835,130 B2
DATED : December 28, 2004
INVENTOR(S) : Pope et al.

It is certified that error appears in the above-identified patent and that said Letters Patent is hereby corrected as shown below:

Column 7,
Line 17, delete "is"

Signed and Sealed this

Tenth Day of May, 2005

JON W. DUDAS
*Director of the United States Patent and Trademark Office*